United States Patent
Narita et al.

(10) Patent No.: US 6,521,336 B2
(45) Date of Patent: Feb. 18, 2003

(54) ALIPHATIC POLYESTER COMPOSITIONS, FILM MADE THEREOF AND LAMINATES THEREOF

(75) Inventors: Junichi Narita, Ibaraki-ken (JP); Tohru Sawai, Ibaraki-Ken (JP); Ichiro Takeishi, Ibaraki-ken (JP); Suekazu Itoh, Ibaraki-ken (JP)

(73) Assignee: Tohcello, Co., Ltd., Tokyo (JP)

( * ) Notice: Subject to any disclaimer, the term of this patent is extended or adjusted under 35 U.S.C. 154(b) by 0 days.

(21) Appl. No.: 09/961,393

(22) Filed: Sep. 25, 2001

(65) Prior Publication Data

US 2002/0065345 A1 May 30, 2002

(30) Foreign Application Priority Data

Sep. 28, 2000 (JP) .................................. 2000-296429
Aug. 30, 2001 (JP) .................................. 2001-262187

(51) Int. Cl.$^7$ ...................... B32B 27/06; B32B 27/10; B32B 27/18; B32B 27/36
(52) U.S. Cl. ...................... 428/349; 428/346; 428/347; 428/355 EN; 428/480; 428/481; 524/270; 524/271; 525/184; 525/437; 525/444
(58) Field of Search ................ 428/480, 481, 428/34.2, 346, 343, 347, 349, 355 EN; 525/444, 437, 184; 524/270, 271

(56) References Cited

U.S. PATENT DOCUMENTS

| | | | | |
|---|---|---|---|---|
| 5,252,646 A | * | 10/1993 | Iovine et al. | 524/270 |
| 5,679,421 A | * | 10/1997 | Brinton, Jr. | 383/1 |
| 5,700,344 A | * | 12/1997 | Edgington et al. | 156/327 |
| 5,883,199 A | * | 3/1999 | McCarthy et al. | 428/35.2 |
| 6,051,663 A | * | 4/2000 | Yamamoto et al. | 524/81 |
| 6,153,276 A | * | 11/2000 | Oya et al. | 383/109 |
| 6,326,440 B1 | * | 12/2001 | Terada et al. | 525/411 |

* cited by examiner

*Primary Examiner*—Vivian Chen
(74) *Attorney, Agent, or Firm*—Armstrong, Westerman & Hattori, LLP

(57) ABSTRACT

Disclosed is a composition provided with biodegradable property and transparency which is excellent in heat sealing property at low temperatures, peelability and adhesiveness to substrate as well as a film or laminate of the composition. The composition comprises as indispensable components thereof 27–70% by weight of polylactic acid, 70–27% by weight of an aliphatic polyester, and 1–20% by weight of a tackifier selected from the group consisting of: an aliphatic cyclic hydrocarbon resin, a metal salt of a rosin ester, and a rosin ester having an acid number of 10 or less.

7 Claims, No Drawings

ALIPHATIC POLYESTER COMPOSITIONS, FILM MADE THEREOF AND LAMINATES THEREOF

BACKGROUND OF THE INVENTION

1. Field of the Invention

The present invention relates to an aliphatic polyester composition suitable for obtaining films provided with biodegradable property which are excellent in transparency, interlaminar adhesiveness and heat sealing strength as well as films and laminates made thereof.

2. Description of the Prior Art

Polylactic acid and an aliphatic polyester, which are representative examples of a biodegradable polymer, are higher in crystallinity and rigid in molecular structure so that they are greater in heat of fusion on heat sealing and thus poor in heat-sealing property. All of the biodegraoable polymers have a melting point of at most about 200° C. Thus, a difference in melting point is not distinct among the materials in a multi-layer film of a substrate/binder/sealant.

As heating of the film is effected from the side of the substrate, transmission of heat toward the sealant is insufficient if the heat sealing temperature is low, so that heat sealing strength of the resultant laminated film becomes poor. On the other hand, if the heat sealing temperature is elevated to enable transmission of heat to the sealant sufficiently, the substrate may also be molten so that thickness of the whole laminated film becomes thin to cause a phenomenon called "edge breaking" which means breaking of the: film from the side of edge. Accordingly, it is impossible to manufacture a film container (bag) for packing liquid from such film. Even if a bag is manufactured, it utterly fails to satisfy the demand for packing liquid. As a means for overcoming such problems, a method wherein polylactic acid is mixed with an aliphatic polyester in a composition to improve heat sealing property (Japanese Laid-open Patent Applns. Nos. Hei. 9-157408 and Hei. 11-222528) or a biodegradable packaging material wherein such composition is utilized as a heat sealing layer (Japanese Laid-open Patent Appln. Hei. 11-20084) are proposed hitherto.

PROBLEMS TO BE SOLVED BY THE INVENTION

Such methods are effective for improving heat sealing property but are still insufficient in the effect and involves in some cases damaging transparency that is a character of the biodegradable polymer. In addition, such compositions are insufficient in a good balance of heat sealing strength and peelability when used as a cover or lid material for plastic containers comprised of polylactic acid.

In case two multilayer films made of a stretched polylactic acid film laminated with a heat sealing layer of a composition of the polylactic acid and an aliphatic polyester is heat-sealed mutually, for example, the heat sealing strength may significantly be enhanced. However, when the aforesaid composition layer is heat sealed with a polylactic acid film, the heat sealing strength is still low so that the effect of improving in heat sealability at low temperature is insufficient. Thus, its packaging application is inevitably limited as compared with the conventional polyolefin packaging materials. In addition, there may be the case wherein a covering material excellent in peelability is not obtained by using a heat sealing layer of the aforesaid composition layer on a container obtained, for example, by thermally molding polylactic acid sheet.

Under the above circumstances, there is a great demand in this art to develop a new type biodegradable aliphatic polyester composition which overcomes the problems seen in the prior art compositions and can be furnished with excellent heat sealable property at low temperatures and peelability in addition to the inherent biodegradable property and transparency.

BRIEF SUMMARY OF THE INVENTION

1. Objects of the Invention

It is an object of the present invention to improve heat sealing property at low temperatures without spoiling biodegradable property which is an inherent character of biodegradable polymers as well as transparency.

It is another object of the present invention to provide an aliphatic polyester composition possessing excellent heat sealing strength and peelability as well as the inherent biodegradable property and transparency.

It is still another object of the present invention to provide a film made of the aliphatic polyester composition by way of any suitable molding method.

It is still further object of the present invention to provide a laminate possessing sufficient heat sealing strength and peelability as a thermally fusible layer of a biodegradable polymer as well as excellent adhesiveness to a substrate.

Other and further objects, features and advantages of the present invention will become apparent more fully from the following description.

2. Means of Solving the Problems

Taking the aforementioned circumstances into consideration, the present inventors have made extensive research for developing a new type aliphatic polyester composition which overcomes the various drawbacks seen in the prior art biodegradable polymer compositions and enables the production of a biodegradable composition enhanced in heat seal strength and peelability without spoiling the inherent biodegradable property and transparency. As a result of such extensive research, it has now been found surprisingly that an aliphatic polyester composition composed of a specific proportion of polylactic acid, an aliphatic polyester and a tackifier exhibits a remarkably high heat sealing strength and peelability while maintaining good adhesion to a substrate. The present invention has been accomplished on the basis of the above finding.

In accordance with an embodiment of the present invention, there is provided an aliphatic polyester composition possessing excellent heat sealable property, which comprises 9–90% by weight of polylactic acid (A), 90–9% by weight of an aliphatic polyester (B), and 1–209% by weight of a tackifier (C).

In accordance with another embodiment of the present invention, there is provided a film made of the aforesaid aliphatic polyester composition by way of any suitable molding method.

In accordance with still another embodiment of the present invention, there is provided a laminate which comprised of a substrate and an aliphatic polyester composition on at least one surface of the substrate, the aliphatic polyester composition possessing excellent heat sealable property and comprising 9–90% by weight of polylactic acid (A), 90–9% by weight of an aliphatic polyester (B) and 1–20% by weight of a tackifier (C).

In a preferred embodiment of the present invention, the aliphatic polyester (B) is an ester obtained by ring-opening polymerization of a cyclic lactone and the tackifier (C) is a rosin derivative or an aliphatic cyclic hydrocarbon resin.

DETAILED DESCRIPTION OF THE INVENTION

Below is a detailed description on the individual components constituting the aliphatic polyester composition of the present invention.

Polylactic Acid (A):

Polylactic acid (A) used in the aliphatic polyester composition generally stands for homopolymers of lactic acid, including poly(L-lactic acid) in which the structure unit is L-lactic acid, poly(D-lactic acid) in which the structure unit is D-lactic acid and poly(DL-lactic acid) in which the structure unit is DL-lactic acid, 1.e. a racemic equiamount mixture of D-lactic acid and L-lactic acid; copolymers of lactic acid containing lactic acid as the predominant component and a small proportion of a copolymerizable comonomer, for example, a copolymer of lactic acid with less than 50% by weight, preferably not more than 30% by weight, more preferably not more than 10% by weight of glycolic acid; and a mixture of these. Illustrative of the comonomer copolymerizable with lactic acid are, for example, a 3-hydroxybutyrate, caprolactone, glycolic acid and the like. Among these polymers, a homopolymer of lactic acid can preferably be used as it excels in transparency.

Any of the known polymerization methods, such as polycondensation method and ring-opening polymerization can be adopted for polymerization of lactic acid. In polycondensation method, for example, L-lactic acid, D-lactic acid or a mixture of these is directly subjected to dehydropolycondensation whereby a polylactic acid of a desired composition can be obtained.

In the ring-opening polymerization method, a lactide which is a cyclic dimer of lactic acid is subjected to polymerization by the aid of a polymerization-adjusting agent and a catalyst thereby obtaining polylactic acid. A lactide includes L-lactide which is a dimer of L-lactic acid, D-lactide which is a dimer of D-lactic acid and DL-lactide which is a condensate of L-lactic acid and D-lactic acid. These isomers can be mixed and polymerized, if necessary, to obtain polylactic acid having any desired composition and crystallinity, A small amount of a chain-extending agent, for example, a diisocyanate compound, an epoxy compound or an acid anhydride can be used for the purpose of increasing molecular weight of the polylactic acid. A weight average molecular weight of the polylactic acid is usually within the range of 60,000–1,000,000. If the molecular weight is less than 60,000, a practical physical property may hardly be exhibited according to the intended use. On the other hand, if the molecular weight is more than 1,000,000, the melt viscosity may be excessively high to make molding workability poor.

Aliphatic Polyester (B):

Aliphtic polyester (B) used in the aliphatic polyester composition includes, with the exception of the aforesaid polylactic acid (A), an aliphatic polyester obtained by condensing an aliphatic diol with an aliphatic dicarboxylic acid, an aliphatic polyester obtained by ring-opening polymerization of a cyclic lactone, a synthetic aliphatic polyester, an aliphatic polyester biosynthesized in microorganism, etc.

Examples of the aliphatic polyester obtained by condensing an aliphatic diol with an aliphatic dicarboxylic acid include those obtained from ethylene glycol, 1,4-butanediol and 4-cyclohexanedimethanol, etc. as the aliphatic diol and succinic acid, adipic acid, suberic acid, sebacic acid and dodecanedicarboxylic acid, etc. as the aliphatic dicarboxylic acid. Among these, at least one diol and at least one dicarboxylic acid are selected and polycondensed and, if necessary, a chain-extending agent such as an isocyanate compound may be sued to increase the molecular weight of the polyester whereby a polymer having a desired molecular weight can be obtained.

Examples of the aliphatic polyester obtained by ring-opening polymerization of a cyclic lactone include polymers obtained by polymerization of one or more cyclic monomers such as ε-caprolactone, δ-valerolactone, β-methyl-β-valerolactone, etc.

As the synthetic aliphatic polyester, there can be mentioned copolymers of a cyclic acid anhydride and an oxlane compound, such as a copolymer of succinic anhydride and ethylene oxide or propylene oxide.

As the aliphatic polyester biosynthesized by microorganisms is known an aliphatic polyester biosynthesized by acetyl coenzyme A (Acetyl CoA) in micro-organisms including Alcaligenes eutrophus. This aliphatic polyester is chiefly poly-β-hydroxybutyric acid (poly3HB). It is indusrially advantageous, however, to copolymerize this with a valeric acid unit (HV) to form poly(3HB-co-3HV). An HV copolyrnerizing ratio is generally 0–40%. It is also possible to copolymerize this with a longer chain hydroxyalkanoate. Among the aliphatic polyester (B), that obtained by ring-opening polymerization of a cyclic lactone, in particular poly(ε-caprolactone) is preferable as this polymer excels in improving effect of enhancing heat sealing property at low temperatures, heat sealing strength and softening.

Tackifier (C);

Illustrative of the tackifier (C) used in the aliphatic polyester composition are, for example, a phenol type resin such as coumarone-indene resin, p-tert-butylphenol-acetylene resin, phenol-formaldehyde resin, terpene-phenol resin, and xylene-formaldehyde resin; a terpene type resin such as β-pinen resin, α-pinene resin, dipenten base resin, styrene-modified terpene resin, and synthetic polyterpene resin; a terpene resin devoid of any polar group; a petroleum hydrocarbon resin such as an aromatic hydrocarbon resin, an aliphatic hydrocarbon resin, an aliphatic cyclic hydrocarbon resin, an aliphatic and alicyclic petroleum resin, an aliphatic and aromatic petroleum resin, and a hydrogenated hydrocarbon resin; and a rosin derivative such as pentaerythritol ester of rosin, glycerol ester of rosin, methyl ester of hydrogenated rosin, triethylene glycol ester of hydrogenated rosin, a metal salt of a rosin ester, and a special rosin ester having an acid number of 10 or less. Among these, the aliphatic cyclic hydrocarbon resin, the metal salt of a rosin ester, the special rosin ester having an acid number of 10 or less are preferable since these excel; in improving effect of transparency, heat sealing property at low temperatures, heat seal strength. Further, a hydrogenated, particularly hydrogenated at least 80%, especially at least 95% petroleum hydrocarbon resin devoid of any polar group is preferable as it is very small in odor and excellent in color tone.

Aliphatic Polyester Composition:

The aliphatic polyester composition of the present invention is composed of the aforesaid polylactic acid (A), the aliphatic polyester (B) and the tackifier (C) in a proportion of (A):(B):(C)=9–90:90–9:1–20, preferably (A):(B):(C) 27–70:70–27:3–10. By defining the proportion within the above range, the composition in the form of a film is excellent in transparency, bonding strength to a substrate, and flexibility. The composition is also excellent in heat sealing property at low temperatures and heat sealing strength when used as a heat sealable layer on laminates.

The aforementioned proportion is critical for achieving the desired properties. If the proportion of the polylactic acid (A) is less than 9% by weight, transparency and rigidity of the resultant film will be insufficient. On the other hand, the proportion exceeds 90% by weight, impact strength and flexibility of the resultant film may become inferior. If the proportion of the aliphatic polyester (B) is less than 9% by weight, flexibility and impact strength will be insufficient, and on the other hand, if the proportion exceeds 90% by weight, transparency and rigidity may be damaged. If the proportion of the tackifier (C) is less than 1% by weight, the improving effect for heat sealing property at low temperatures and heat sealing strength may not be exhibited. On the other hand, if the proportion exceeds 20% by weight, transparency may become poor or adhesiveness of the resulting film may become excessive or viscosity at the time of melting will be reduced so that molding property may seriously damaged or the improving effect for heat sealing property may not be exhibited.

The aliphatic polyester composition of the present invention is obtained by blending the individual ingredients (A), (B) and (C) in the aforesaid proportion homogeneously by the aid of Henshell mixer, V-blender, a ribbon blender or a tumbler mixer, or after blending, further melt kneading the mixture by the aid of an uniaxial extruder, a polyaxial extruder, Bambury mixer or the like.

The aliphatic polyester composition of the present invention is thermoplastic and may be incorporated, if necessary, with one or more of ordinary additives such as antioxidants, weathering-resistant stabilizers, antistatic agents, anti-clouding agents and the like in an amount not damaging the object of the present invention, separately at the time of incorporating the ingredients (A), (B) and (C) or at the time of incorporating the composition. The composition of the present invention may be in the form of a mixture thus blended, a filmy structure or a sheet.

Films:

The composition of the present invention in the form of a film or sheet can be manufactured by molding according to a variety of known methods For example, the indispensable ingredients (A), (B) and (C) are blended in a given proportion and then treated directly in a film-forming apparatus by the aid of a T-die or a cyclic die to form a film. Alternatively, the ingredients (A), (B) and (C) in a given proportion are blended previously and the mixture is subjected to melt kneading in an extruder to form an aliphatic polyester composition which is then molded to a film by extruding by the aid of a T-die or cyclic die or subjected to press molding. The film thus obtained may be used as such (single layer). In case a laminate film is manufactured, however, the aliphatic polyester composition as a heat sealable layer and a substrate are coextruded by the aid of a multilayer die thereby to form a laminated film. The aliphatic polyester composition may be extruded onto a previously obtained substrate to form a laminate film, or alternatively, films separately obtained may be bonded together to form a laminate film. In case the film is used as a covering material, a single layer film or a sheet or a laminate film each provided with a heat sealable layer obtained according to the aforementioned method may be used as such as a covering material or may be printed. It is also possible to laminate a paper or foil such as aluminum foil which has been printed or not yet by heat with the film or sheet for a covering material. Depending on the intended use, the film or sheet may previously be cut in conformity with the size of a container for covering use.

Substrate:

Various materials usually employed as packaging material, for example, a film, or sheet, cup, tray, or these foamy materials, glass, metal, aluminum foil, or paper made of a polyolefin such as polyethylene, polypropylene, polybutene, or polymethylpentene; a polyester such as polyethylene terephthalate or polycarbonate; a widely used polymer such as nylon, polystyrene, polyvinyl chloride, polyvinylidene chloride, polyvinyl alcohol, ethylene-vinyl alcohol copolymier, polymethylmeacrylate or ethylene-vinyl acetate copolymer; a biodegradable polymer, such as polylactic acid or an aliphatic polyester; a thermoplastic resin such as thermoplastic polyurethane; a thermocurable resin such as a thermocurable polyurethane, a phenol resin, a urea resin, a melamine rein, a unsaturated polyester resin, an epoxy resin, a diallylphthalate resin, a silicone resin or a polyimide resin are mentioned as a substrate to be laminated with the aliphatic polyester composition of the present invention. A film of such thermoplastic Dr thermocurable resin may be non-stretched or uniaxiallry or biaxially stretched. It is a matter of course that the substrate may be unilayer or bilayer or more.

Laminates:

A laminate of the present invention consists of a layer of the aliphatic polyester composition and a layer of the aforementioned substrate. Such laminate can be manufactured according to various known methods; for example, the aliphatic polyester composition and the substrate are coextruded by the aid of a multilayer die to form a laminate film. Otherwise, the aliphatic polyester composition is extruded on the previously obtained substrate to form a laminate film or sheet. Furthermore, both is separately extruded and both films are bonded together to form a laminate. It is a matter of course that a laminate of the biodegradable polymer and paper or the like is biodegradable per se. It is also needless to say that the laminate of the present invention may be thermally deformed, irrespective of whether its form is a film or sheet, to form a various kinds of shape according to the intended uses, e.g. a tray, a cup or a bottle.

EFFECT OF THE INVENTION

The aliphatic polyester composition of the present invention is per so biodegradable and therefore preferable as a sealant film or a material for a sealant layer in a laminate film or sheet. In addition to the inherent nature of biodegradable, the composition is excellent in transparency and good in balance of flexibility and rigidity. A sealant film or a sealant layer of the composition of this invention may be enhanced, if necessary, in heat sealing property at low temperatures, heat sealing strength. In case a laminate involving the, composition of the invention is used as a covering material for a container, the degree of peelable strength may be varied, if necessary, according to the intended use.

The aliphatic polyester composition of the present invention excels in heat sealability at low temperatures in comparison with the conventional biodegradable heat sealing materials so that the composition may be laminated with a substrate to form a packaging material. As the aliphatic polyester composition per se is of biodegradable, it can be used for other biodegradable material as substrate which is generally not higher in heat-resistance, the resultant laminate per se will also furnished with biodegradable property and good transparency so that the laminate will be suitable as a packaging material excellent in balance of physical properties such as rigidity and flexibility. In case the composition is used as a covering material for a container comprising a biodegradable material, it becomes a covering material of good peelability. Furthermore, the aliphatic polyester composition of the present invention can easily be laminated with paper or easily peelable therefrom so that a container per se made by combining the composition with paper is also biodegradable and can be separated after use by peeling the composition from the paper to be recovered as source. It is possible to vary the proportion of the individual constituents of the aliphatic polyester composition within the range defined in the present invention so that sealing property at low temperatures and heat sealing strength can be enhanced or freely be varied.

EXAMPLES

The present invention will now be illustrated in more detail by way of Examples and Comparative Examples. It is however to be construed that the present invention is not limited by these Examples.

Materials used in Examples and Comparative Examples are those listed as follows:
(1) Polylactic acid (A) (PLA):
   Produced by Mitsui Chemicals Inc. (Japan), a trade name LACEA H-100, specific gravity: 1.26, Vicat softening point: 58° C, MFR (190° C., load: 2160 g) 13 g/10 min.
(2) Aliphatic polyester (B) (poly-ε-caprolactone: PCL):
   Produced by Daicel Chemical (Japan), a trade name CELGREEN PH 7, specific gravity: 1.14, Vicat softening point: 55° C., MFR (190° C., load: 2160 g) 1.7 g/10 min.
(3) Aliphatic polyester (B') (polybutylene succinate adipate: PBSA):
   Produced by Showa Highmolecule (Japan), a trade name: BIONOLLE 3020, specific gravity: 1.23, WFR (190° C., load: 2160 g) 28 g/10 min.
(4) Tackifier (C) (Metal salt of specific rosin ester: Tackifier-1):
   Produced by Arakawa Chemical (Japan), a trade name KE-359, Vicat softening point: 96–106° C., an acid number: 8–18
(5) Tackifier (C') (A specific rosin ester: Tackifier-2):
   Produced by Arakawa Chemical (Japan), a trade name SUPER ESTER A-100, Vicat softening point:.95–105° C., an acid number: not more than 10
(6) Tackifier (C") (An aliphatic cyclic hydrocarbon: Tackifier-3):
   Produced by Arakawa Chemical (Japan), a trade name ARKON P-100, Vicat softening point: 95–105° C.

Example 1

<Preparation of a Composition>
PLA, PCL and Tackifter-1 were weighed in a mixing ratio 48,5:48.5;3.0, the percentage being by weight, and the mixture was melt kneaded at 180° C., using a uniaxial extruder of 40 mmφ to prepare COMPOSITION-1.
<Preparation of a Film>
Using a uniaxial extruder provided with a T-die of 40 mmφ at the tip thereof, the COMPOSITION-1 was extruded at a molding temperature of 180° C. to obtain a non-stretched film of 25 μm in thickness.
<Manufacture of Laminate Film>
Using adhesive agents of polyurethane type (manufactured by Takeda Pharmaceutical Ind. (Japan), a trade name TAKELAC A-968 and TATELAC A-8) each in a ratio of 20% plus ethyl acetate in a ratio of 60%, the aforementioned non-stretched film was dry laminated on a biaxially stretched film of 25 μm in thickness comprised of PLA and stretched at a stretch ratio of 3.0×3.0 whereby a laminate film of 52–53 μm in thickness was obtained.
<Measurement of Heat Sealing Strength>

1. Heat seal characteristics to the non-stretched film surface:
   The surface of the non-stretched film in the laminated film thus formed were overlapped each other and fixed by thermal fusion under the condition of a given temperature for one second and a seal surface pressure of 1 kg/cm$^2$, using TP-701-B HEATSEAL TESTER manufactured by Tester Ind. (Japan). By the way, heating was limited only to the upper side of a heat seal bar of the tester at a given temperature while the lower side of the bar was not heated. The laminate film thus thermally fused was tested by a TENSILON Universal Tester RTC-1225 manufactured by Orientec Inc. (Japan) whereby the sample fixed by thermal fusion having a width of 15 mm was peeled off at a tensile velocity of 300 mm/min and a maximum strength at the test was referred to as a heat sealing strength.
2. Hleat seal characteristics to the non-stretched PLA film surface:
   The surface of the non-stretched film in the laminated film thus formed was overlapped with the surface of a PLA non-stretched film of 50 μm in thickness and measured a heat sealing strength thereof in accordance with the above method.
3. Heat seal characteristics to paper:
   The surface of the non-stretched film in the laminated film thus formed was overlapped with the surface of a paper (Nihon Papaer Mfg. Inc., Japan; 300 μm in thickness and a unit weight of 260 g/m$^2$) for cup and measured a heat sealing strength thereof in accordance with the above method.

<Measurement df Young's Modulus>
A sample of 15 mm in width and 100 mm in length in test portion was cut out from the non-stretched film and measured for Young's modulus at a tensile velocity of 5 mm/mmin., using a TENSILON Universal Tester RTC-1225 marketed from Orientec Inc. (Japan).

<Measurement of Haze>
Transparency (degree of haze) of the non-stretched film was measured by using a Haze Meter 300A marketed from Nihon Denshoku Kogyo KK (Japan).

Example 2

A test was carried out in the same manner as described in the foregoing Example 1 except that PLA, PCL and Tackifier-1 were employed in a proportion of 47.5:47.5:5.0 in terms of percentage by weight in place of the composition used in Example 1.

Example 3

A test was carried out in the same manner as described in the foregoing Example 1 except that PLA, PCL and Tackifier-2 were employed in a proportion of 48.5:48.5:3.0 in terms of percentage by weight in place of the composition used in Example 1.

Example 4

A test was carried out in the same manner as described in the foregoing Example 1 except that PLA, PCL and Tackifier-2 were employed in a proportion of 47.5:47.5:5.0 in terms of percentage by weight in place of the composition used in Example 1.

Example 5

A test was carried out in the same manner as described in the foregoing Example 1 except that PLA, PCL and Tackifier-3 were employed in a proportion of 48.5:48.5:3.0 in terms of percentage by weight in place of the composition used in Example 1.

Comparative Example 1

A test was carried out in the same manner as described in the foregoing Example 1 except that PLA and PCL were employed in a proportion of 50.0:50.0 in terms of percentage by weight in place of the composition used in Example 1.

Example 6

A test was carried out in the same manner as described in the foregoing Example 1 except that PLA, PCL and Tackifier-1 were employed in a proportion of 29.1:67.9:3.0 in terms of percentage by weight in place of the composition used in Example 1.

Example 7

A test was carried out in the same manner as described in the foregoing Example 1 except that PLA, PCL and Tackifier-1 were employed in a proportion of 28.5:66.5:3.0 in terms of percentage by weight in place of the composition used in Example 1.

Example 8

A test was carried out in the same manner as described in the foregoing Example 1 except that PLA, PCL and Tackifier-2 were employed in a proportion of 29.1:67.9:5.0 in terms of percentage by weight in place of the composition used in Example 1.

Example 9

A test was carried out in the same manner as described in the foregoing Example 1 except that PLA, PCL and Tackifier-2 were employed in a proportion of 27.0:63.0:10.0 in terms of percentage by weight in place of the composition used in Example 1.

Example 10

A test was carried out in the same manner as described in the foregoing Example 1 except that PLA, PCL and Tackifier-3 were employed in a proportion of 28.5:66.5:5.0 in terms of percentage by weight in place of the composition used in Example 1.

Example 11

A test was carried out in the same manner as described in the foregoing Example 1 except that PLA, PCL and Tackifier-3 were employed in a proportion of 29.1:67.9:3.0 in terms of percentage by weight in place of the composition used in Example 1.

Comparative Example 2

A test was carried out in the same manner as described in the foregoing Example 1 except that PLA and PCL were employed in a proportion of 30.0:70.0 in terms of percentage by weight in place of the composition used in Example 1.

Example 12

A test was carried out in the same manner as described in the foregoing Example 1 except that PLA, PCL PBSA, and Tackifier-2 were employed in a proportion of 47.5:14.2:33.3:5.0 in terms of percentage by weight in place of the composition used in Example 1.

Comparative Example 3

A test was carried out in the same mariner as described in the foregoing Example 1 except that PLA, PCL and PBSA were employed in a proportion of 50.0:15.0:35.0 in terms of percentage by weight in place of the composition used in Example 1.

Referential Example 1

A test was carried out in the same manner as described in the foregoing Example 1 except that PLA alone was employed in place of the composition used in Example 1.

Referential Example 2

A test was carried out in the same manner as described in the foregoing Example 1 except that PCL alone was employed in place of the composition used in Example 1.

Referential Example 3

A test was carried out in the same manner as described in the foregoing Example 1 except that PCL and PBSA were employed in a proportion of 30.0:70:0 in terms of percentage by weight in place of the composition used in Example 1.

A result of the measurements obtained in Examples, Comparative Examples and Referential Examples is shown in Tables 1 and 2 below.

TABLE 1

A result of the measurements

| | | Ex 1 | Ex 2 | Ex 3 | Ex 4 | Ex 5 | Com Ex 1 | Ex 6 | Ex 7 |
|---|---|---|---|---|---|---|---|---|---|
| PLA | % by Weight | 48.5 | 47.5 | 48.5 | 47.5 | 48.5 | 50 | 29.1 | 28.5 |
| PCL | % by Weight | 48.5 | 47.5 | 48.5 | 47.5 | 48.5 | 50 | 67.9 | 86.5 |
| | Tackifier No. | 1 | 1 | 2 | 2 | 3 | — | 1 | 1 |
| Tackifier | % by weight | 3.0 | 5.0 | 3.0 | 5.0 | 3.0 | — | 3.0 | 5.0 |
| haze | (%) | 6.8 | 6.5 | 7.3 | 8.4 | 9.8 | 7.7 | 14.1 | 15.0 |
| Young's modulus | MD | 2070 | 2070 | 1980 | 1830 | 1990 | 2020 | 1020 | 1070 |
| (MPa) | TD | 1880 | 1810 | 1820 | 1590 | 1730 | 1910 | 970 | 1010 |
| Heat Sealing Strength | Temp. (° C.) | | | | | | | | |
| Against | 65 | | | | | | | 3.9 | 0.3 |
| Non-stretched | 70 | 0.8 | 1.0 | 0.5 | 1.2 | 1.9 | 0.7 | 19.5 | 9.9 |
| film | 80 | 4.1 | 5.3 | 4.3 | 6.4 | 8.2 | 6.0 | 19.1 | 15.6 |
| | 90 | 7.7 | 9.8 | 8.8 | 9.5 | 12.7 | 7.5 | | |
| | 100 | 11.1 | 13.1 | 10.3 | 20.0 | 19.6 | 9.7 | 22.5 | 21.5 |
| | 120 | 14.4 | 17.7 | 16.7 | | | 15.1 | | |

TABLE 1-continued

A result of the measurements

| | | Ex 1 | Ex 2 | Ex 3 | Ex 4 | Ex 5 | Com Ex 1 | Ex 6 | Ex 7 |
|---|---|---|---|---|---|---|---|---|---|
| | 140 | 19.0 | | | | | | | |
| Against | 70 | 0.2 | 0.2 | 0.2 | 0.2 | 0.3 | 0.1 | 3.2 | 0.4 |
| PLA Non- | 80 | 1.2 | 1.3 | 0.9 | 1.5 | 2.2 | 1.6 | 4.2 | 8.1 |
| stretched film | 90 | 6.8 | 7.1 | 6.7 | 7.0 | 7.8 | 4.8 | 7.8 | 7.1 |
| | 100 | 7.9 | 8.0 | 8.2 | 8.6 | 8.1 | 5.1 | 9.9 | 10.2 |
| | 120 | 9.5 | 8.8 | 9.8 | 10.7 | 10.2 | 7.1 | 11.6 | 13.1 |
| | 140 | 10.9 | 9.2 | 11.1 | 12.6 | 11.5 | 8.5 | | |
| Against | 100 | | | 0.2 | 0.8 | | 0.0 | | |
| paper | 120 | | | 0.3 | 0.8 | | 0.0 | | |
| | 140 | | | 0.8 | 1.2 | | 0.1 | | |
| | 160 | | | 1.7 | 1.8 | | 0.7 | | |

Remarks;
Ex: An abbreviation of Example
Com: An abbreviation of Comparative

TABLE 2

A result of the measurements (cont'd)

| | | Ex 8 | Ex 9 | Ex 10 | Ex 11 | Cm Ex 2 | Ex 12 | Cm Ex 3 | Ref 1 | Ref 2 | Ref 3 |
|---|---|---|---|---|---|---|---|---|---|---|---|
| PLA | % by weight | 29.1 | 27.0 | 28.5 | 29.1 | 30 | 47.5 | 50.0 | 100 | — | — |
| PCL | % by weight | 67.9 | 63.0 | 66.5 | 67.9 | 70 | 14.2 | 15.0 | — | 100 | 30 |
| PBSA | % by weight | — | — | — | — | — | 33.3 | 35.0 | — | — | 70 |
| | Tackifier No. | 2 | 2 | 3 | 3 | — | 2 | — | — | – | — |
| Tackifier | % by weight | 3.0 | 10.0 | 5.0 | 3.0 | — | 5.0 | — | — | — | — |
| Haze | (%) | 14.8 | 27.3 | 22.6 | 19.4 | 13.6 | 3.4 | 4.0 | 2.5 | 13.6 | 13.0 |
| Young's modulus | MD | 1400 | 1530 | 1230 | 1360 | 1460 | 1840 | 1840 | 3320 | 440 | 648 |
| (MPa) | TD | 970 | 650 | 940 | 1300 | 1270 | 1720 | 1650 | 3120 | 640 | 750 |
| Heat Sealing Strength | Temp. (° C.) | | | | | | | | | | |
| Against | 65 | 0.4 | 0.3 | 0.5 | 0.2 | 0.2 | | | 0.2 | | |
| NOn-stretched | 70 | 4.8 | 17.1 | 1.5 | 1.3 | 5.5 | 0.0 | 0.0 | 0.2 | 0.2 | 0.0 |
| film | 80 | 19.9 | 18.3 | 18.7 | 15.5 | 18.1 | 0.2 | 0.3 | 0.2 | 0.3 | 0.0 |
| | 90 | | | | | | 0.7 | 0.5 | 0.5 | 0.3 | 0.0 |
| | 100 | 19.6 | 18.4 | 23.6 | 22.7 | 19.2 | 2.3 | 0.7 | 10.5 | 0.5 | 1.0 |
| | 120 | | | | | | 15.1 | 13.6 | 11.0 | 5.3 | 16.1 |
| | 140 | | | | | | 17.0 | 17.0 | | 10.7 | 16.4 |
| Against | 70 | 1.4 | 1.2 | 0.5 | 0.5 | 0.4 | 0.0 | 0.0 | 0.2 | 0.2 | 0.0 |
| PLA Non- | 80 | 2.8 | 3.8 | 4.0 | 2.9 | 2.2 | 0.0 | 0.0 | 0.2 | 0.2 | 0.2 |
| stretched | 90 | 5.5 | 7.5 | 9.2 | 9.2 | 3.4 | 0.2 | 0.2 | 0.2 | 0.3 | 0.6 |
| film | 100 | 6.9 | 9.3 | 9.5 | 11.3 | 5.3 | 3.0 | 0.6 | 0.5 | 0.4 | 1.2 |
| | 120 | 8.3 | 11.6 | 13.6 | 13.8 | 7.0 | 6.3 | 4.6 | 10.5 | 6.2 | 5.2 |
| | 140 | 9.6 | 11.6 | | | 8.5 | 12.7 | 6.3 | 11.0 | 6.4 | 8.2 |
| Against | 100 | 0.4 | 0.8 | | | 0.3 | 0.3 | | | | |
| paper | 120 | 0.7 | 1.7 | | | 0.3 | 0.3 | | | | |
| | 140 | 0.9 | 2.5 | | | 0.5 | 0.5 | | | | |
| | 160 | 1.6 | 3.0 | | | 0.5 | 0.5 | | | | |

Remarks:
Ex: An abbreviation of Example
Cm: An abbreviation of Comparative
Ref: An abbreviation of Referential Example As is evident from the foregoing Examples and Comparative Examples, the heat sealing strength of the laminate could be enhanced without damaging transparency (haze) and flexibility (Young's modulus) by adding Tackifier-1, -2 or -3, as in Examples 1–5, to a system of PLA/PCL=50/50 like Comparative Example 1. In Examples 4 and 5, for Example, the heat sealing strength between the surfaces at 100° C. is about 2 times as much as the value in Comparative Example 1, thus exhibiting outstanding effect. It is also evident that the heat selling strength between the non-stretched PLA film and paper is remarkably improved.

It was also confirmed that the heat sealing strength of the laminate could be enhanced without damaging transparency (haze) and flexibility (Young's modulus) by adding Tackifier-1, -2 or -3 as in the case of Examples 6–10 to a system of PLA/PCL=30/70 like Comparative Example 2. In Examples 6, 7, 9 and 10, for example, the heat sealing strength against PLA non-stretched film at 100° C. is 1.5–2 times as much as the value of Comparative Example 2, thus exhibiting outstanding effect. Moreover, the heat sealing strength between the surfaces is improved. In comparison of Example 8 with Comparative Example 2, it is evident that a high degree of improvement is achieved in the heat sealing strength against paper.

It is understood that the preceding representative examples may be varied within the scope of the present specification both as to ingredients and treating conditions, by those skilled in the art to achieve essential the same results.

As many widely different embodiments of the present invention may be made without departing from the spirit and scope thereof, it is to be construed that the present invention is not limited to the specific embodiments thereof except as defined in the appended claims.

What is claimed is:

1. A heat sealable aliphatic polyester composition which comprises 27–70% by weight of polylactic acid (A), 70–27% by weight of an aliphatic polyester (B), and 1–20% by weight of a tackifier (C) selected from the group consisting of an aliphatic cyclic hydrocarbon resin, a metal salt of a rosin ester and a rosin ester having an acid number of 10 or less.

2. An aliphatic polyester composition according to claim 1, wherein the aliphatic polyester composition comprises 3–10% by weight of a said tackifier (C).

3. An aliphatic polyester composition according to claim 1, wherein the aliphatic polyester (B) is an aliphatic polyester obtained by ring-opening polymerization of a cyclic lactone.

4. A biodegradable film made of the aliphatic polyester composition according to claim 1 by way of any suitable molding method.

5. A laminate which is comprised of a substrate and an aliphatic polyester composition on at least one surface of the substrate, the aliphatic polyester composition comprising 27–70% by weight of polylactic acid (A), 70–27% by weight of an aliphatic polyester (B) and 1–20% by weight of a tackifier (C) selected from the group consisting of an aliphatic cyclic hydrocarbon resin, a metal salt of a rosin ester and a rosin ester having an acid number of 10 or less.

6. A laminate according to claim 5, wherein the substrate is a biodegradable polymer.

7. A laminate according to claim 5, wherein the substrate is paper.

* * * * *